E. Reynolds
Hay Fork.

No. 45,634. Patented Dec. 27, 1864.

Witnesses
Chas. W. Hord
James T. Graham

Edmond Reynolds
By Chas. P. Hord
Atty

UNITED STATES PATENT OFFICE.

EDMOND REYNOLDS, OF CORUNNA, MICHIGAN.

IMPROVEMENT IN HAY-ELEVATING FORKS.

Specification forming part of Letters Patent No. 45,634, dated December 27, 1864.

*To all whom it may concern:*

Be it known that I, EDMOND REYNOLDS, of Corunna, in the county of Shiawassee and State of Michigan, have invented certain Improvements in Hay-Elevators, of which the following is a specification.

My invention and improvements relate to the form of the fork-tines and to the manner in which the fork-tines are held in position for sustaining the hay.

Figure 1:
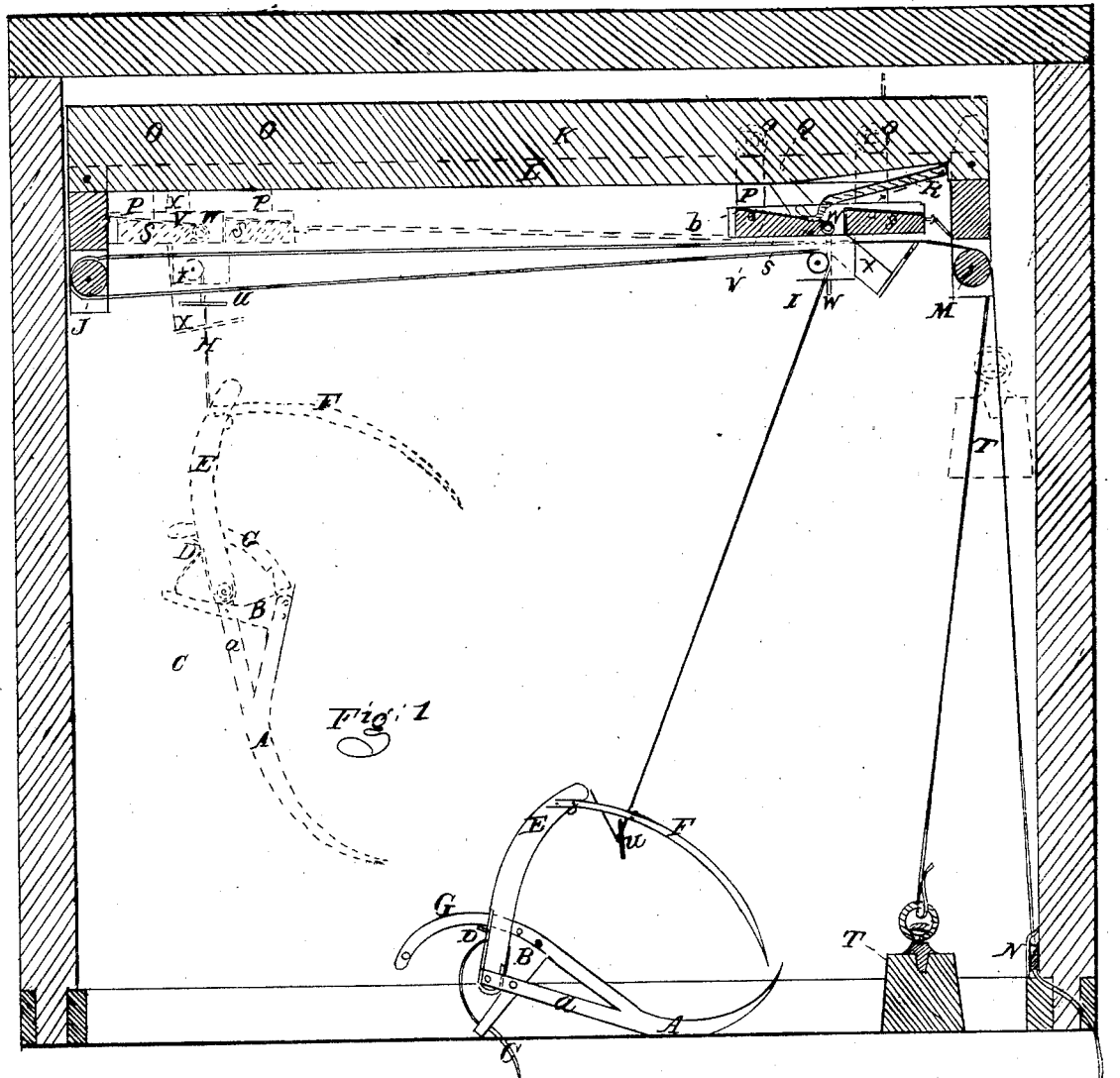
Figure 2:
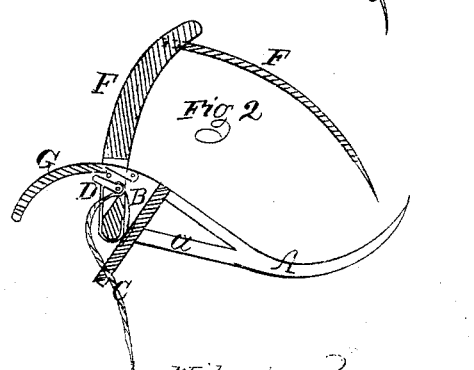
Figure 3:
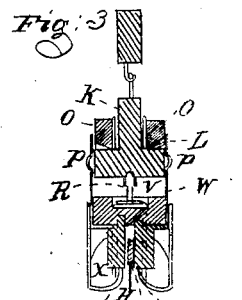

In the drawings, Figure 1 is a side view of the fork and a vertical longitudinal section of the apparatus by which the fork and hay are elevated and transported. Fig. 2 is a vertical longitudinal section of the fork, and Fig. 3 is a vertical cross-section of the apparatus by which the fork and hay are elevated and transported.

A are the fork-tines, which are constructed with a brace, *a*, to strengthen them and allow them to be made lighter than they could otherwise be made.

B is a block, to which the tines are attached, and which also serves as a handle in loading the fork and as a guide for the rope C, by which the lever D is operated.

E is the arm by which the fork is elevated and supported, to which the finger F is attached, and through which the catch G passes. The tines A are pivoted to the lower end of the arm E by a pin which passes through the ends of the braces *a*, which braces are made to extend beyond the block B and through the lower end of the arm E.

F is a finger attached to the arm E to keep the hay in place on the tines while being elevated and transported to the required place.

G is a catch fastened to the block B, passing through the arm E, and catching by a notch in its lower side upon a pin which passes through the arm E.

D is a small lever pivoted upon a pin passing through the arm E. The use of said lever is to raise the catch G above the pin, upon which it catches, and discharge the hay from the fork when said fork has arrived at the proper point. This is accomplished by means of the rope C, which is attached to one end of the lever D. By pulling upon said rope the other end of the lever D is raised against the lower side of the catch G and lifts said catch above the pin, by which it is held, when the weight of the tines and hay causes the tines to drop and the hay is discharged from the fork.

H is a rope attached to the upper end of the arm E, by which the fork is elevated. Said rope passes over a pulley, I, in the carriage; thence over a pulley, J, in a block attached to the farther end of the beam K, by which the way or track L is supported; thence back and over a pulley, M, in a block attached to the nearer end of said beam K; thence down and over a pulley, N, attached to some fixed support near the floor or ground, and thence to the place where the horse is attached to the end of said rope.

K is a beam hung from the ridge-pole or rafters of the barn, or from suitable supports in any place where the hay is to be unloaded.

L are side pieces, ways, or tracks attached to each side of said beam, upon which tracks the wheels O of the carriage run.

P are supports which are attached to the axles of the wheels O, and which support the other parts of the carriage, and also the fork and hay when elevated, the nearer pair of supports being made with grooves, as represented at *p*, to pass over the projecting ends of the pin Q.

R is a catch pivoted to the lower side of the beam K, and supported in such a position that its inclined end may strike and slide up the inclined upper surface of the nearer end of the block S of the carriage when said carriage is drawn back by the weight T. The farther end of the block S is inclined upward from the middle toward the end, so as to form a shoulder, over which the catch R may drop and hold the carriage in place while the fork is being loaded with hay.

U is a piece or button attached to the rope H a short distance above the end of the arm E.

V is a plate or spring attached at one end to the inclined part of the upper surface of the farther part of the block S, as represented at the point indicated by the letter *b*. The other end of said spring rests upon the heads or upper ends of the pin or pins W; or the pins W may be made in nearly the form of an inverted U, thus ⊓, the free end of the plate or spring resting upon the horizontal part. The inclined surface of the nearer end of the block S may be covered with a plate to prevent wearing from the sliding of the catch R.

X is a swing-catch pivoted to the block S.

When the carriage is drawn back by the weight T the upper ends of said catch strike against the projecting ends of the pin Q, the carriage being then in the position represented in black lines; but when the carriage advances from that position the catch swings into place, ready to assist in supporting the loaded fork, and it is also designed to sustain the unloaded fork while being drawn back by the weight T until it is moved away by the pin Q, and the fork is allowed to descend to be again loaded.

Operation: The apparatus being in the position represented in black lines, the fork is loaded with hay and the horse started. The loaded fork is elevated until the button U strikes the pins W and raises the plate or spring V until the catch R is raised above the block S, when the carriage is immediately drawn forward by the combined action of the weight of the loaded fork and the tension of the rope H until the fork is directly over the place where it is designed to deposit the hay. Then the lever D is operated by the rope C, the fork-tines fall into the position represented in red lines, and the hay is discharged from the fork. The horse is then backed up and the carriage and fork are drawn back by the weight T until the catch R falls into place, and the catch X is moved out of the way, allowing the fork to descend to be again loaded.

I claim—

The combination and arrangement of the braced tines A and the catch G with the block B, the arm E, and the small lever D, substantially as and for the purpose set forth.

EDMOND REYNOLDS.

Witnesses:
SPENCER B. RAYNALE,
M. H. REYNOLDS.